United States Patent
Dali et al.

(10) Patent No.: US 12,282,511 B2
(45) Date of Patent: Apr. 22, 2025

(54) DATABASE CONTAINER ORCHESTRATOR

(71) Applicant: Google LLC, Mountain View, CA (US)

(72) Inventors: Boris Dali, Denver, CO (US); Hao Hu, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/080,419

(22) Filed: Dec. 13, 2022

(65) Prior Publication Data

US 2023/0185856 A1 Jun. 15, 2023

Related U.S. Application Data

(60) Provisional application No. 63/288,796, filed on Dec. 13, 2021.

(51) Int. Cl.
*G06F 16/90* (2019.01)
*G06F 9/44* (2018.01)
*G06F 16/903* (2019.01)

(52) U.S. Cl.
CPC .......... *G06F 16/90335* (2019.01); *G06F 9/44* (2013.01)

(58) Field of Classification Search
CPC ................................................ G06F 16/90335
USPC ........................................................ 707/809
See application file for complete search history.

(56) References Cited

U.S. PATENT DOCUMENTS

| | | | |
|---|---|---|---|
| 10,404,474 B1 * | 9/2019 | Caceres | H04L 9/3268 |
| 10,545,975 B1 * | 1/2020 | Mahdy | G06F 16/2425 |
| 10,922,090 B1 * | 2/2021 | Lieberman | G06F 9/455 |
| 2007/0073703 A1 * | 3/2007 | Quin | H04L 61/4552 |
| 2020/0073739 A1 * | 3/2020 | Rungta | G06F 8/60 |

FOREIGN PATENT DOCUMENTS

EP 3365808 B1 * 8/2021 ............. G06F 16/21

* cited by examiner

*Primary Examiner* — Syling Yen
(74) *Attorney, Agent, or Firm* — Lerner David LLP

(57) ABSTRACT

Aspects of the disclosure provide for a database container orchestrator system for deploying and managing containerized databases running on a computing platform. A system can include a database daemon for translating first commands, such as remote procedure calls, into second commands, such as queries built from SQL statements, which cause the database to retrieve data or perform other functions otherwise unavailable to an application incompatible with the database. The first commands received by the database daemon can be defined by an interface of a computing platform running containers for both the database and the database daemon. The interface can be an Application Programming Interface (API), which can include definitions of commands for starting, configuring, and running a containerized database, regardless of the different codebases represented by the containerized database and other applications.

20 Claims, 5 Drawing Sheets

DATABASE CONTAINER ORCHESTRATOR

CROSS-REFERENCE TO RELATED APPLICATIONS

This application claims the benefit of the filing date of U.S. Provisional Patent Application No. 63/288,796 filed Dec. 13, 2021, the disclosure of which is hereby incorporated herein by reference.

BACKGROUND

An application container orchestrator is a system for deploying and managing computer programs, called applications. The application orchestrator deploys applications on computing resources and makes the applications available for access by other devices or programs on a computing platform implementing the orchestrator. A container image includes the necessary operating system(s), scripts, data, software libraries, and other such code for running an application. A container is an executing container image. Containers are typically immutable, such that changes to the code of a container image in a container requires rebuilding the container. Applications running in containers are called containerized applications.

A pod is a collection of one or more deployed containers. A pod can implement a number of network ports assigned to a respective container. Containers within the pod can communicate data to-and-from their respective assigned port.

A pod runs on one or more nodes. A node is a collection of computing resources, such as physical servers, microcontrollers, or virtual machines. A cluster is a collection of one or more nodes. A cluster includes a control plane running on one or more control plane nodes exposing an interface for scheduling and managing the state of worker nodes in the cluster running pods. A namespace in a cluster organizes the cluster into multiple virtual sub-clusters. Namespaces allow for dividing resources on a cluster among different groups of users, for example through resource quotas and access mechanisms for controlling permissions different users have vis-à-vis different namespaces.

Different applications running in a cluster can be built from different codebases, for example different collections of software and software tools, such as frameworks, for building applications. For example, an application built from a first codebase may offer features, such as data recovery or authentication, which are not natively accessible to a different application built from a second, different, codebase. Further, developing an application for cross-compatibility with other applications that may also run in the same cluster is complex and inefficient, as the combination of potentially different applications running in the same cluster is large and unpredictable.

BRIEF SUMMARY

Aspects of the disclosure provide for a database container orchestrator system for deploying and managing containerized applications and databases running on nodes of a computing platform. A system, as described herein, can include a database daemon for translating commands, such as remote procedure calls, into commands, such as queries built from SQL statements, which cause the other to retrieve data or perform other functions otherwise unavailable to an application incompatible with the database.

Databases, which include data and software for querying and updating the data, can be built from a codebase or by a development team different from a codebase or development team of other applications running in the same cluster as the database. Other applications deployed by the system may require querying the database for executing their workflow but lack compatibility to use different features otherwise available to applications built from the same codebase as the database. Unlike other orchestrators, aspects of the disclosure provide for a system with support for operations and features available on the deployed database, extending a standard interface for a cloud computing environment to provide those operations and features for management of the containerized database.

The commands received by the database daemon can be defined by an interface of a computing platform running containers for both the database and the database daemon. The interface can be an Application Programming Interface (API), which can include definitions of commands for starting, configuring, and running a containerized database, regardless of the different codebases represented by the containerized database and other applications.

Aspects of the disclosure provide for a system including: one or more nodes including a database daemon configured to: receive a first command by the database daemon running on a first container, the first command received from a first application generated from a first codebase; generate, by the database daemon, one or more query commands from the first command; and send, by the database daemon, the one or more query commands to a database running on a second container different from the first container, the database generated from a second codebase different from the first codebase.

Aspects of the disclosure provide for a method performed by one or more nodes implementing a database daemon, the method including: receiving a first command by the database daemon running on a first container, the first command received from a first application generated from a first codebase; generating, by the database daemon, one or more query commands from the first command; and sending, by the database daemon, the one or more query commands to a database running on a second container different from the first container, the database generated from a second codebase different from the first codebase.

Aspects of the disclosure provide for one or more non-transitory computer-readable media storing instructions that when executed by one or more nodes causes the one or more nodes to implement a database daemon and perform operations including: receiving a first command by the database daemon running on a first container, the first command received from a first application generated from a first codebase; generating, by the database daemon, one or more query commands from the first command; and sending, by the database daemon, the one or more query commands to a database running on a second container different from the first container, the database generated from a second codebase different from the first codebase.

These and other aspects of the disclosure can include one or more optional features, such as the features, below. In some examples, aspects of the disclosure include all of the following features, in combination.

The first command is a remote procedure call.

The database is a second database generated from the second codebase; and wherein the one or more nodes are further configured to: receive remote procedure calls and generate one or more query commands by the database daemon for a third database generated from a third codebase different from the second codebase.

The database daemon is further configured to: receive, in response to sending the one or more query commands, data responsive to a query defined by the one or more query commands.

The database daemon includes a database daemon proxy in the second container, the database daemon proxy configured to start the database.

The one or more nodes are configured to: receive an image of the database; store the image of the database in data storage accessible by a cluster formed from the one or more nodes; generate the database as a containerized database using the image of the database; and generate an instance including the first container including the database daemon and the second container including the containerized database.

In generating the instance, the one or more nodes are further configured to install the database daemon proxy in the second container.

The one or more nodes are configured to start the database daemon and database daemon proxy using a database daemon init container.

The database daemon init container is configured to provide a binary of the database in memory shared between the first and the second container.

The database daemon proxy is configured to perform an authentication process for the database, wherein in performing the authentication process the database daemon proxy enables communication between the database daemon and the database.

DETAILED DESCRIPTION

Overview

Figure 1:
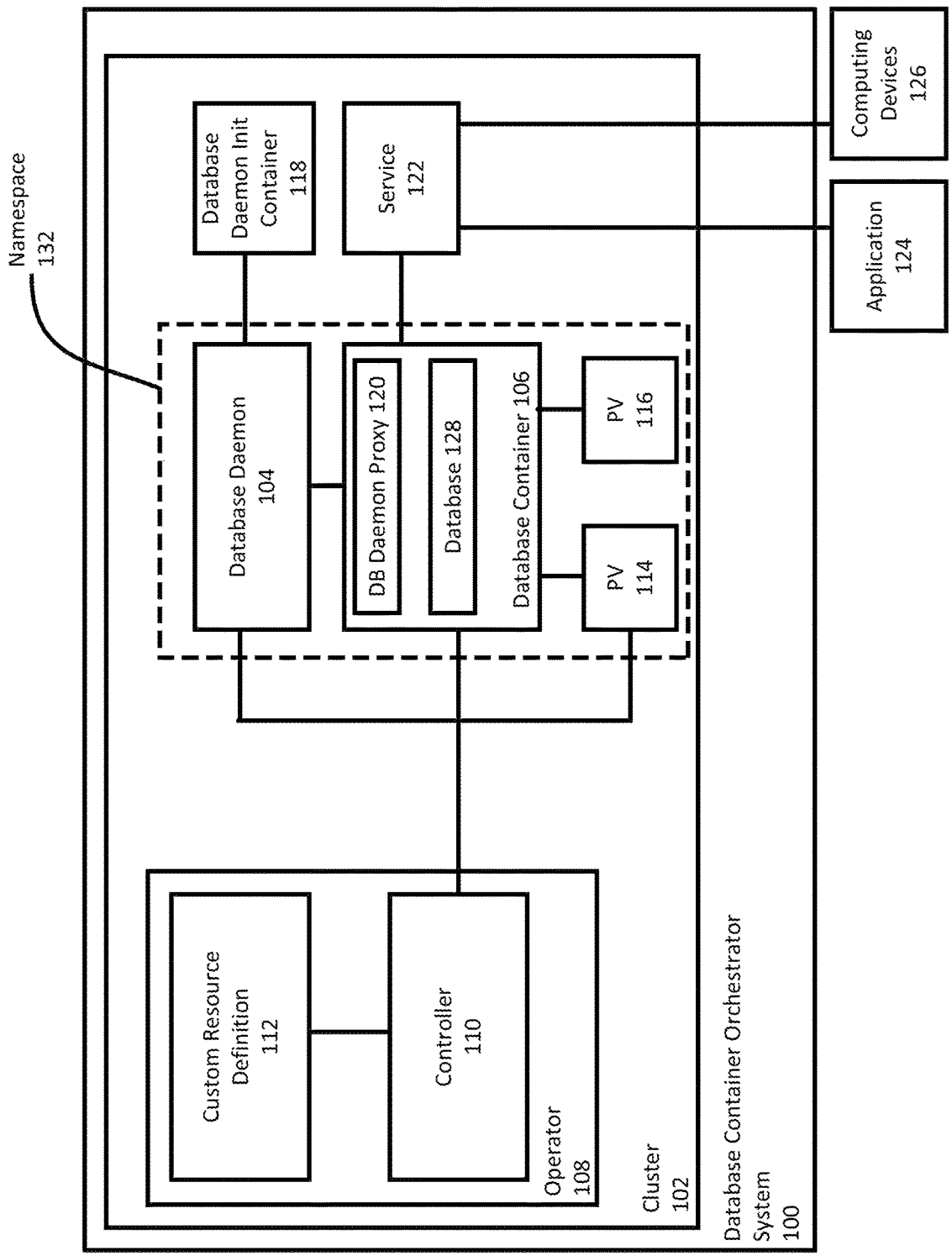
FIG. 1 is an example of a cluster in a database container orchestrator system implementing a database daemon and a database container, according to aspects of the disclosure.

Aspects of the disclosure provide a database container orchestrator system ("system") for managing and deploying containerized databases. A database daemon running in a pod and also implementing a database container can receive and translate remote procedure calls into queries, for example, as SQL statements. The database daemon of the system provides for managing both database and non-database containers through a common interface.

For example, the system can implement containerized database management as a new interface or an extension to an existing interface to the platform. In some examples, the system is at least partially implemented as a Custom Resource Definition (CRD) or through another mechanism available on the platform for adding custom resources to an existing orchestration environment.

The system can be implemented onto existing container orchestration environments, for example, as an operator pattern available in some orchestrators. The system can be implemented according to an operator pattern, in which the system extends the existing interface of an existing application container orchestrator to provide for containerized database management as described herein.

The system provides a middle-ground between an Infrastructure-as-a-Service (IaaS) and a fully managed Database-as-a-Service (DBaaS). A database can be containerized and run in a cluster without requiring that database features integrate or be compatible with existing applications on the platform. Instead, the execution of a database can be off-loaded according to aspects of the disclosure for execution without compromising features unique to the deployed database. Example features of a containerized database that may not be accessible to other applications of a cluster include data backup/recovery, multi-tenant access, versioning, and other features for patching the database.

The use of existing database-specific features of the containerized database can be maintained by a database daemon of the system by communicating with a database container through a standard interface provided by the platform. Other applications in and out of the same cluster as the containerized database communicate commands, such as remote procedure calls, to the database daemon, which in turn translates the commands into commands interpretable by the containerized database.

The interface provided by the database daemon can be used for any of a variety of different types of databases. Through the database daemon, the system provides for the automation of a variety of tasks that would otherwise be unavailable due to software differences in different applications and databases running in the same cluster. For example, database lifecycle operations, such as backups, replication, and patching, can be automated through existing patterns of an application container orchestration environment. In addition, databases can be distributed onto clustered nodes with different priority and resource requirements. When distributing databases on worker nodes, the system can prioritize the resource requirements for each database, because the system can apply the same load-balancing and allocation mechanisms of the system available for other containerized applications.

Aspects of the disclosure allow for both the use of these features available in cloud computing environments while allowing for a drop-in implementation of a desired containerized database into a cluster with applications of a variety of different codebases and relative different access patterns associated with the database. The "drop-in" nature of the containerized database through the use of the database daemon as described herein facilitates "bring your own device" (BYOD) deployments, at least because the database can be accessed through a standard interface provided by the database daemon, accessible by other applications regardless of the location and nature of the physical hardware the containerized database is deployed on. The system can receive database images and containerize those images in a container separate from the database daemon without requiring modification of the received image.

Further, the system supports implementing databases from different codebases, vendors, and/or development teams through a standard interface implemented using the database daemon. In other words, the system does not require "lock-in" to an implementation of a containerized database for a particular vendor or entity.

Aspects of the disclosure also provide for an initialization container ("init container") for initializing the database daemon. The init container for the database daemon stages binaries for the database to be deployed on a shared volume. The database binaries are shared between a database container and the database daemon, allowing the database daemon to start. The database daemon can include a proxy running directly in a database container for a containerized database and be configured to target a subset of operations executable from within a container running the database and perform those operations as part of initializing communication between the database and other applications through the database daemon.

The database daemon and its proxy allow for executing authentication protocols particular to the containerized databases.

The database daemon can be implemented in a separate container as the containerized database, further facilitating independent updates and substitutions between the database and other applications. Instead, the database daemon and the containerized database share the same pod.

Example Systems

FIG. 1 is an example of a cluster 102 in a database container orchestrator system 100 implementing a database daemon 104 and a database container 106, according to aspects of the disclosure. A controller 110 monitors a custom resource definition (CRD) 112 for changes, for example, made by administrators to the cluster 102. The CRD 112 can be configured, for example, to define attributes of the pods, containers, deployments, or services within a cluster. The controller 110 and the CRD 112 are implemented as part of an operator 108. The operator 108 is an application running in the cluster 102 and configured for linking the controller 110 to the CRD 112. The operator 108 extends the existing functionality of the cluster 102 to manage the database daemon 104 according to the CRD 112.

The controller 110 monitors the CRD 112 for any changes, for example made by administrators or other entities. The controller 110 creates and manages computing resources on the cluster 102 making up the database deployment, including the database container 106 and the database daemon 104. For example, the controller 110 manages persistent volumes (PVs) 114, 116 for filesystems and data for the containerized database of the database container 106. The controller 110 can also create and manage a pod (not shown) for running the database container 106 and initializing the database daemon 104 using a database daemon init container 118. The controller 110 causes the database daemon 104 to be created for running commands to the database.

The database daemon 104 is configured for running query and database commands, such as SQL commands, to a database 128 of the database container 106. The database daemon 104 receives remote procedure calls (RPCs) and translates the RPCs by generating one or more query commands. An RPC can be invoked, for example, by an application of the cluster 102, and causes the target of the RPC to execute as if the target is local to the application, for example, running on the same computing device. An RPC can be language-specific, for example, written in Java, C++, C#, etc. RPCs can also communicate data structured according to a particular format, such as a protocol buffer.

The database container 106 can run on the same or a different cluster than the database daemon and the operator 108. The database daemon 104 can also be in a different cluster than the database container 106.

Some operations, such as starting the database, require being performed from within the database container 106 itself. A database daemon proxy 120 runs inside the database container 106 and can be initialized by the database daemon init container 118. The daemon proxy 120 is configured to start and stop a database process running in the database container 106, as well as start or stop a database listener, implemented as part of the daemon proxy 120. The daemon proxy 120 is also configured for managing authentication and communication between the database container 106 and the database daemon 104. For example, the database container 106 can containerize a database developed on a separate codebase than the database daemon 104 or other containerized applications in the cluster 102 or other applications communicating with the cluster 102 through a service 122.

The service 122 runs in the cluster 102 and exposes the containerized database 128 of the database container 106 to applications 124 and/or computing devices 126. The applications 124 may be part of the same cluster 102, a different cluster 102, or no cluster at all. The computing devices 126 can include user computing devices, such as personal computing devices and mobile devices, configured to communicate with the computing platform implementing the cluster 102. The service 122 makes connections available to other applications 124 and/or other computing devices 126 and can either run in the cluster 102 as shown, or outside of the cluster.

The database daemon 104 and the database container 106 can share the same pod 132. The database daemon 104 can reach a database listener implemented as part of the daemon proxy 120, by creating a network socket, for example on a localhost server for the cluster. Sharing a pod allows for inter-process communication (IPC), allowing for shared memory storing the database image to be shared between the database container 106 and the database daemon 104. Examples of shared memory include POSIX shared memory created in the database container 220.

The daemon proxy 120 enables the use of protocols implemented by the database container 106 for local connections between the database container 106 and the rest of the cluster 102, without an added layer of communication that may be required for communicating with the database container 106. The database daemon 104 sets up local connections using a protocol standardized for applications hosted in the cluster, so that other applications communicating with the database container 106 do not require being configured to communicate data according to a protocol unique to the database container 106. Requiring the use of database-specific protocols limits the extendibility of the database container 106 to communicate with other applications. Database-specific protocols also affect the supportability of independently handling issues that may arise during execution of the database container, without adversely affecting the execution or performance of the other applications of the cluster 102.

The database daemon init container 118 is executed to start up the database daemon 104. The database daemon init container 118 stages binaries of the containerized database that are shared between the database container 106 and the database daemon 104. The database daemon init container starts the database container 106, including the daemon proxy 120.

In some examples, the system 100 as described herein can be configured for database backup of the database container 106 and other containerized databases. The system 100 can provide multiple forms of backup, including snapshot-based backup and backup functionality offered by the containerized database. In snapshot backup mode, the system 100 creates clones or copies of the database. The system can perform operations to generate the snapshots and store the snapshots in persistent volumes, such as persistent volumes 114, 116 or volumes outside of the cluster 102. The snapshot backup mode operations scale with the size of the database, making it an available option for containerized databases of different sizes. In snapshot backup mode, the system 100 can recover a database by loading a snapshot backed up at an earlier time.

As the database container 106 implements a database 128 built from a different codebase or framework as what is used for other containerized applications in the cluster 102, the database container 106 may include backup functionality for backing up and restoring data according to operations particular to the database container 106. The system 100, through the database daemon 104, can receive commands to back up the database in the database container 106 according to a specific backup function, even if the backup function is not native to the codebase or framework used to build the database daemon 104 or other applications in the cluster 102. The database daemon can receive, for example, a command defined in an interface for communicating with the database container 106. The command, when executed by the database daemon 104, causes the database daemon to translate the command into database-specific commands for invoking backup functionality particular to the database container 106.

The system 100 can receive a manifest file for configuring a CRD, such as the CRD 112 of FIG. 1, specifying how the cluster is to be configured, including whether to make use of snapshot or a database-specific backup mode, as well as how the backed-up data should be handled or restored. The system 100 is configured to deploy a configuration of the cluster 102 according to a received manifest file. The manifest file can be written in a variety of languages for data serialization, such as YAML, JSON, XML, etc. The operator 108 can be configured to manage a control loop of iteratively checking the observed state of the cluster 102 relative to a desired state specified by the CRD 112 and configuring the cluster 102 to align with the desired state.

Figure 2:
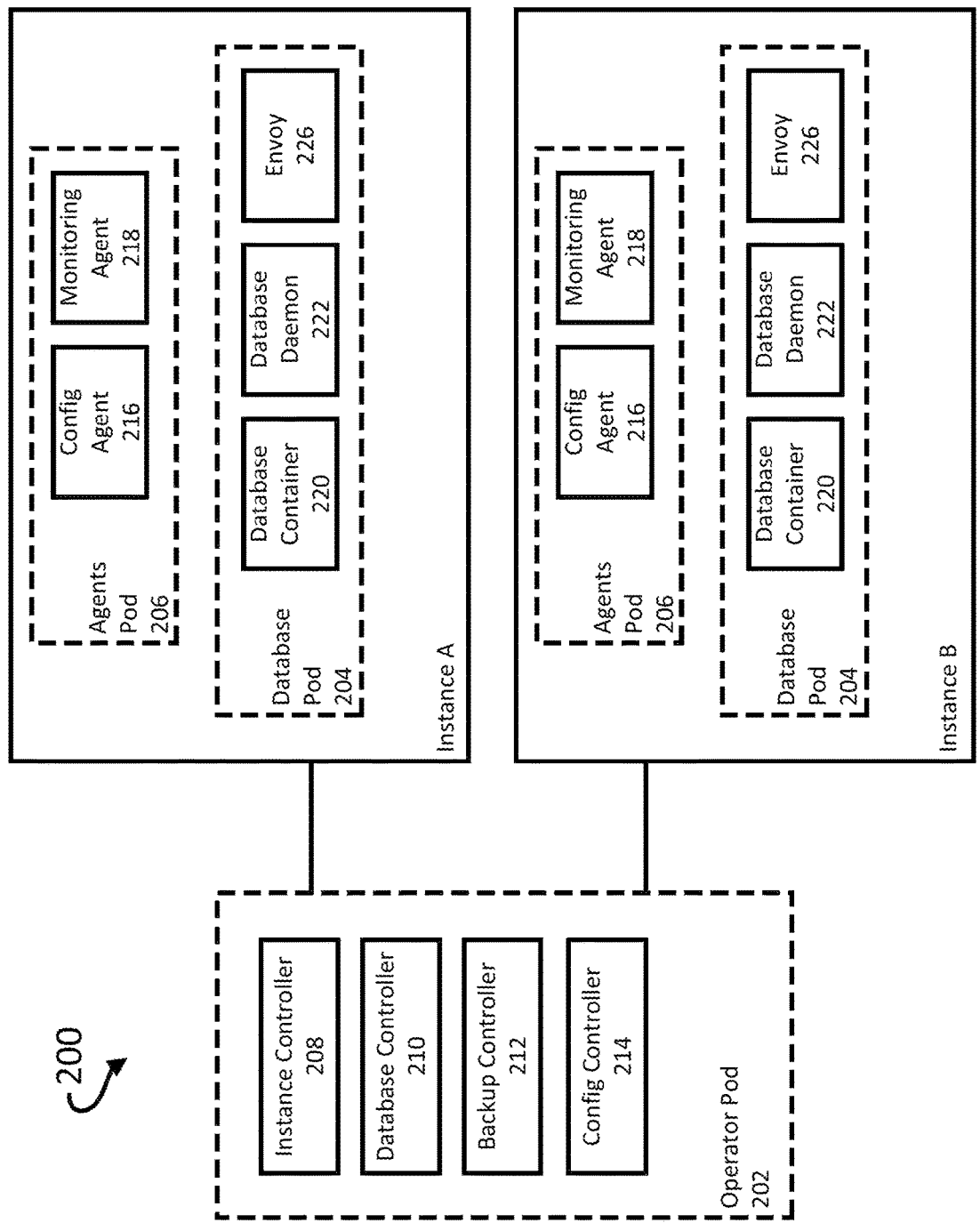
FIG. 2 is a block diagram of an example separation of containers across a cluster implementing a first instance A and a second instance B of the database container orchestrator system as described herein.

FIG. 2 is a block diagram 200 of an example separation of containers across a cluster implementing a first instance A and a second instance B of the database container orchestrator as described herein. In FIG. 2, dashed boxes indicate pods of containers, for example, operator pod 202, database pods 204, and agents pods 206.

Operator pod 202 can include controllers 208-214. Example controllers include an instance controller 208 for managing different instances of the database container orchestrator system, a database controller 210 for managing containerized databases, a backup controller 212 for managing backup and recovery of the containerized databases, and a config controller 214 for monitoring instances and causing changes to the cluster to match a desired state specified by a CRD.

The operator pod 202 is shared among instances A, B, which can each include a number of containers separated into separate pods. An instance is a collection of data, and a cluster can include one or more instances. An instance can include an agents pod 206 for running agents configured for managing the cluster and applications running on the cluster according to a respective instance.

The agents pod 206 can include a config agent 216 for receiving commands from the config controller 110 to enact changes to the instance. The agents pod 206 can also include a monitoring agent 218 for monitoring the instance and providing monitoring information back to the operator pod 202. The config controller 110 can use the received monitoring information to determine whether the observed state of the instance matches a desired state specified by a received manifest file. The config agent 216 and the monitoring agent 218 can run on the same or different containers within the agents pod 206.

In addition, or as an alternative to the config agent 216 and the monitoring agent 218, the agents pod 206 can include other agents to facilitate other functions, such as additional agents for data migration to a containerized database and/or creation of a standby database in a container hosted by the database container orchestrator.

The database pod 204 includes the database container 220, database daemon 222, and an envoy 226 for the instance. The database container 220, database daemon 222, and the envoy 226 can each run on separate containers. Separating the containers of the agents pod 206 and the database pod 204 can facilitate independent updates to applications running in the containers of the pods 204, 206, without causing unnecessary downtime for other applications. For example, separating the agents from the containers in the database pod 204 allows for updates to the config agent 216 without causing unnecessary downtime to the database container 220. If the database container 220 and the config agent 216 were in the same pod, an update to the config agent 216 would inevitably lead to downtime in the database container 220. Agents in the agents pod 206 may also evolve more quickly through software updates than changes to applications in the database pod 204. Therefore, another advantage of separating agents from components of the database application orchestrator is to shield the database pod 204 from the expected volatility of the agents pod 206.

In some examples, the database container orchestrator system 100 can include features for managing stateful and stateless applications. In a stateless application, data used during a current execution of the application is not saved for use in a subsequent execution of the application. In a stateful application, data may be saved from execution-to-execution of the application. In those examples, the database container orchestrator system 100 can be configured to wrap the agents pod 206 in a software object for managing stateless agents 216, 218, while the database pod 204 may be wrapped in a software object for managing stateful applications, such as the database container 220. Also in those examples, the operator pod 202 can include controllers for managing stateful and stateless pods.

Further, the containers in the agents pod 206 include applications that may be in existence before a database is containerized and launched into the cluster. Initially, separating the database container 220 from other components for running the instance in a cluster ensures that the execution of the agents in the agents pod 206 continue uninterrupted.

The database container 220 can run on a container separate from the database daemon 222. Running the database daemon 222 enhances the flexibility of the database container orchestrator system 100, at least because the amount of software necessary to bundle with the database container 220 for the container to run in the cluster is reduced. Instead, the database daemon 222 and the database container can share the same pod. The envoy 226 can run as a container alongside the database container 220 and the database daemon 222.

Example Methods

Figure 3:
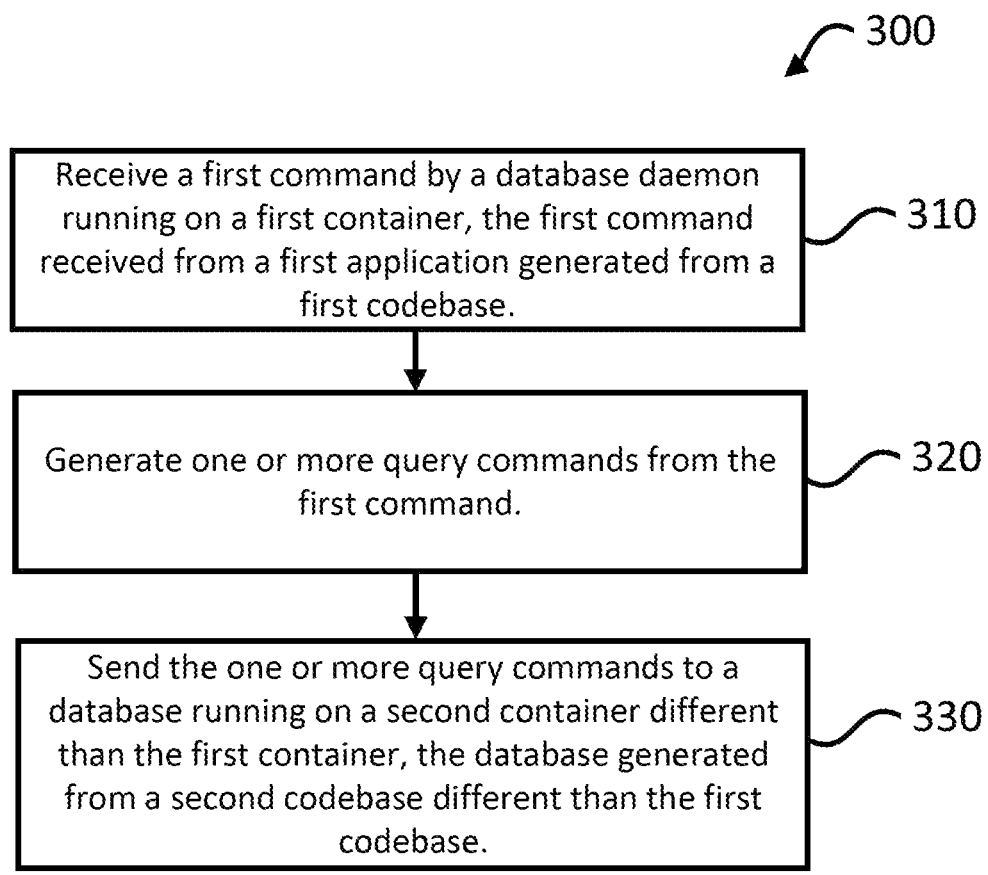
FIG. 3 is a flowchart of an example process for processing commands for a database by a database daemon of a database container orchestrator system, according to aspects of the disclosure.

FIG. 3 is a flowchart of an example process 300 for processing commands for a database by a database daemon of a database container orchestrator system, according to aspects of the disclosure.

The database daemon receives a first command running on a first container, the first command received from a first application generated from a first codebase, according to block 310. The first command can be defined according to an interface implemented by the database container orchestrator system. For example, the first command can be a remote procedure call defined by an API implemented by the database container orchestrator system.

The database daemon generates one or more query commands from the first command, according to block 320. The one or more query commands, as described herein with reference to FIG. 1, can cause the database to retrieve data responsive to a query formed by the query commands. In some examples, the query commands include commands for causing the database to perform one or more database-specific features, such as backup/data recovery, versioning, and executing an authentication process for the database daemon to be able to access the database.

The database daemon sends the one or more query commands to a database running on a second container different from the first container, the database generated from a second codebase different from the first codebase, according to block 330. the database daemon or another component of the cluster can receive, in response to sending the one or more query commands, data responsive to a query defined by the one or more query commands, such as a database table, and/or one or more rows or columns of a table in the database.

Separating the database daemon from the database allows for the database daemon to facilitate communication between an application built using the first codebase, with any number of different databases, even those built on a different codebase without the first codebase in mind. For example, the database daemon can receive commands and generate query commands for two different databases running on separate containers can be built using different codebases.

As described herein with reference to FIG. 1, the database daemon can include a database daemon proxy implemented as part of the second container. The database daemon proxy can be configured to start the database container.

At the same time, the container running the database daemon and the container running the database can operate in the same pod and namespace, allowing for inter-process communication as described herein with reference to FIG. 1.

Figure 4:
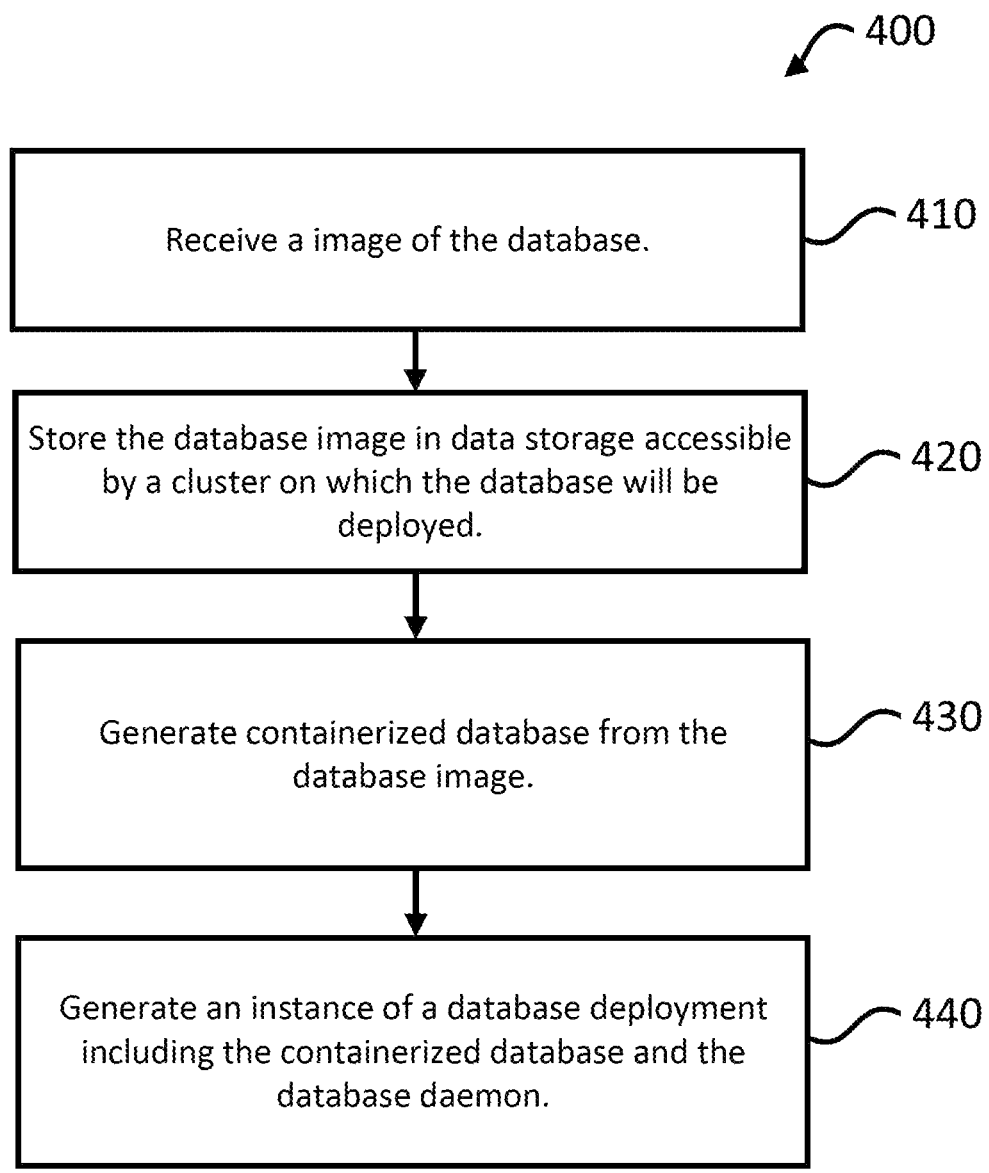
FIG. 4 is a flowchart of an example process for deploying and managing a database container using the database container orchestrator system, according to aspects of the disclosure.

FIG. 4 is a flowchart of an example process 400 for deploying and managing a database container using the database container orchestrator system, according to aspects of the disclosure.

The system receives an image of the database, according to block 410. The image can include a base operating system, a database installation program for installing a database, and other software packages required for running the database once installed. The image can be generated according to received binaries for the database to deploy or can be received from another device or source after being built. The image can include an empty database, or a snapshot of a prebuilt and configured database. The device or source can build the image locally and upload the image to the platform implementing the database container orchestrator system. The image can be a pre-seeded database image, already containing a snapshot of a created and configured database.

The system stores the database image in data storage accessible by a cluster on which the database will be deployed, according to block 420. For example, and as shown in FIG. 1, the data storage can be persistent volumes 114, 116.

The system generates a containerized database from the database image, according to block 430. As part of generating the containerized database, the system installs a database daemon proxy for starting the database and performing authentication, for example as described herein with reference to FIG. 1.

The system generates an instance of a database deployment including the containerized database and the database daemon, according to block 440. As shown in FIG. 2, the instance can be part of multiple instances managed by an operator pod 202. As part of generating an instance, the system receives a manifest file. The manifest file can specify the location of the stored database image. The system submits the manifest file to the cluster, which the system uses to create an operator with a controller and a CRD configured according to the manifest file. In generating the instance, the system is further configured to install the database daemon proxy in the database container. The system can start the database daemon and the database daemon proxy using a database daemon init container. The database daemon init container is configured to provide a binary of the database in memory shared between the database daemon and the database container. The database daemon proxy is configured to perform an authentication process for accessing the database. The database daemon proxy enables communication between the database daemon and the database.

A database daemon init container stages the database binaries on the shared memory, so that the binaries are shared between the database container and the database daemon container. Sharing the volumes allows the database daemon to be launched as a server to translate remote procedure calls into query commands.

Example Computing Environment

Figure 5:
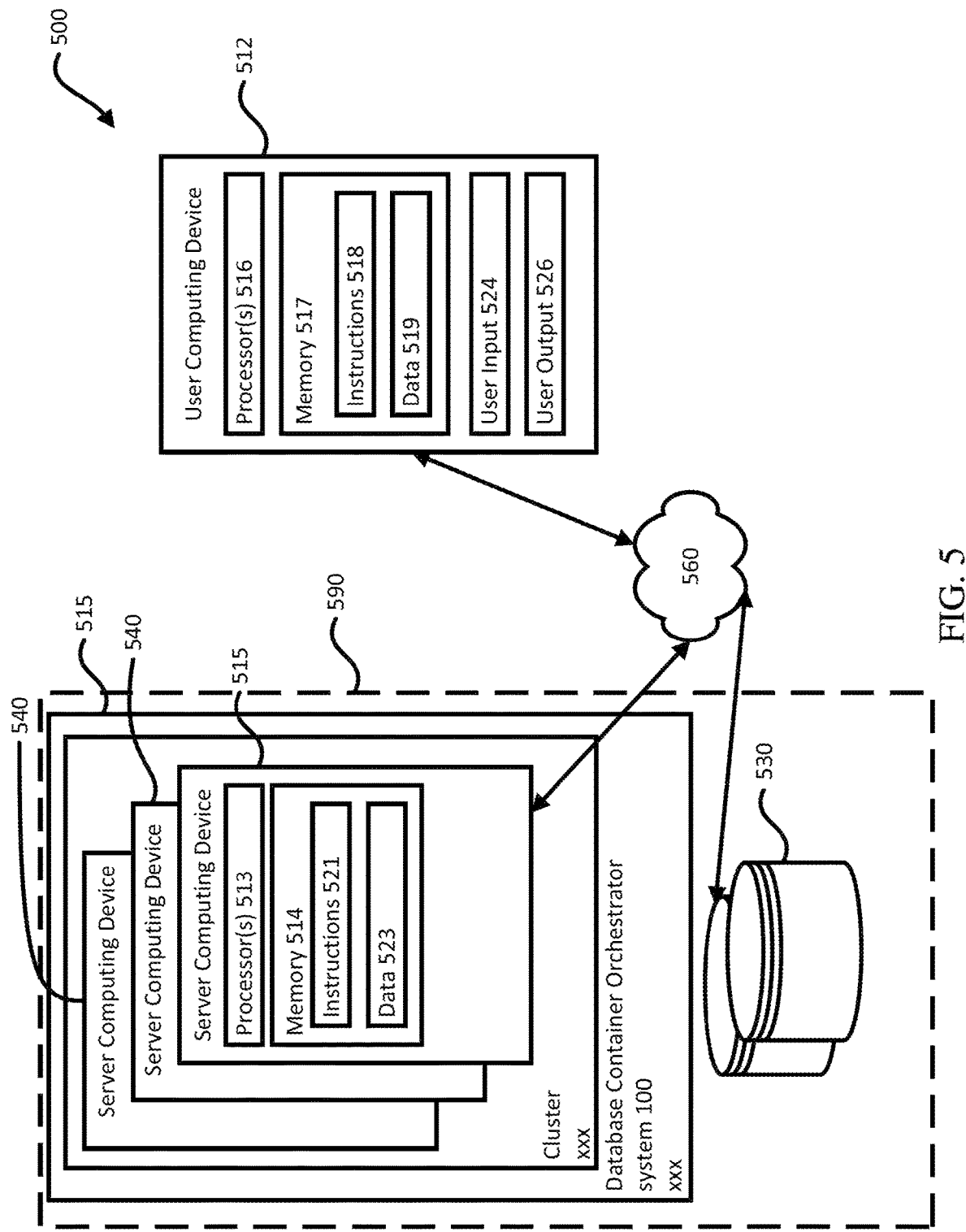
FIG. 5 is a block diagram of an example environment for implementing the database container orchestrator system.

FIG. 5 is a block diagram of an example environment 500 for implementing the database container orchestrator system 100. The system 100 can be implemented on one or more devices having one or more processors in one or more locations, such as in server computing device 515. For example, server computing device 515 can be a node in a cluster. The server computing device 515 can implement multiple virtual machines, which can each be a respective cluster of a node, such as the cluster 102 of FIG. 1. The cluster 102 can include other server computing devices 540 (the following description will reference server computing device 515, but it is understood that the same description is also applicable to server computing devices 540.

User computing device 512 and the server computing device 515 can be communicatively coupled to one or more storage devices 530 over a network 560. The storage device(s) 530 can be a combination of volatile and non-volatile memory and can be at the same or different physical locations than the computing devices 512, 515. For example, the storage device(s) 530 can include any type of one or more non-transitory computer readable media capable of storing information, such as a hard-drive, solid state drive, tape drive, optical storage, memory card, ROM, RAM, DVD, CD-ROM, write-capable, and read-only memories.

The server computing device 515 can include one or more processors 513 and memory 514. The memory 514 can store information accessible by the processor(s) 513, including instructions 521 that can be executed by the processor(s) 513. The memory 514 can also include data 523 that can be retrieved, manipulated, or stored by the processor(s) 513. The memory 514 can be a type of non-transitory computer readable medium capable of storing information accessible by the processor(s) 513, such as volatile and non-volatile memory. The processor(s) 513 can include one or more central processing units (CPUs), graphic processing units (GPUs), field-programmable gate arrays (FPGAs), and/or application-specific integrated circuits (ASICs), such as tensor processing units (TPUs).

The instructions 521 can include one or more instructions that when executed by the processor(s) 513, causes the one or more processors to perform actions defined by the instructions. The instructions 521 can be stored in object code format for direct processing by the processor(s) 513, or in other formats including interpretable scripts or collections of independent source code modules that are interpreted on demand or compiled in advance. The instructions 521 can include instructions for implementing the system 100 consistent with aspects of this disclosure. The system 100 can be executed using the processor(s) 513, and/or using other processors remotely located from the server computing device 515.

The data 523 can be retrieved, stored, or modified by the processor(s) 513 in accordance with the instructions 521. The data 523 can be stored in computer registers, in a relational or non-relational database as a table having a plurality of different fields and records, or as JSON, YAML, proto, or XML documents. The data 523 can also be formatted in a computer-readable format such as, but not limited to, binary values, ASCII, or Unicode. Moreover, the data 523 can include information sufficient to identify relevant information, such as numbers, descriptive text, proprietary codes, pointers, references to data stored in other memories, including other network locations, or information that is used by a function to calculate relevant data.

The user computing device 512 can also be configured similar to the server computing device 515, with one or more processors 516, memory 517, instructions 518, and data 519. The user computing device 512 can also include a user output 526, and a user input 524. The user input 524 can include any appropriate mechanism or technique for receiving input from a user, such as keyboard, mouse, mechanical actuators, soft actuators, touchscreens, microphones, and sensors.

The server computing device 515 can be configured to transmit data to the user computing device 512, and the user computing device 512 can be configured to display at least a portion of the received data on a display implemented as part of the user output 526. The user output 526 can also be used for displaying an interface between the user computing device 512 and the server computing device 515. The user output 526 can alternatively or additionally include one or more speakers, transducers or other audio outputs, a haptic interface or other tactile feedback that provides non-visual and non-audible information to the platform user of the user computing device 512.

Although FIG. 5 illustrates the processors 513, 516 and the memories 514, 517 as being within the computing devices 515, 512, components described in this specification, including the processors 513, 516 and the memories 514, 517 can include multiple processors and memories that can operate in different physical locations and not within the same computing device. For example, some of the instructions 521, 518 and the data 523, 519 can be stored on a removable SD card and others within a read-only computer chip. Some or all of the instructions and data can be stored in a location physically remote from, yet still accessible by, the processors 513, 516. Similarly, the processors 513, 516 can include a collection of processors that can perform concurrent and/or sequential operation. The computing devices 515, 512 can each include one or more internal clocks providing timing information, which can be used for time measurement for operations and programs run by the computing devices 515, 512.

The server computing device 515 can be configured to receive requests to process data from the user computing device 512. For example, the environment 500 can be part of a computing platform 590 configured to provide a variety of services to users, through various user interfaces and/or APIs exposing the platform services.

The devices 512, 515 can be capable of direct and indirect communication over the network 560. The devices 515, 512 can set up listening sockets that may accept an initiating connection for sending and receiving information. The network 560 itself can include various configurations and protocols including the Internet, World Wide Web, intranets, virtual private networks, wide area networks, local networks, and private networks using communication protocols proprietary to one or more companies. The network 560 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 560, in addition or alternatively, can also support wired connections between the devices 512, 515, including over various types of Ethernet connection.

It is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems.

With respect to the use of substantially any plural and/or singular terms herein, for example (with the term "element" being a stand-in term for any system, component, data, etc.) "an/the element," "one or more elements," "multiple elements," a "plurality of elements," "at least one element," etc., those having skill in the art can translate from the plural to the singular and/or from the singular to the plural as is appropriate to the context and/or application described. The various singular/plural permutations may be expressly set forth herein, for sake of clarity and without limitation unless expressly indicated. Elements with like reference numerals indicate like elements.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A system comprising:
one or more servers configured to:
receive, by the one or more servers, a custom resource definition (CRD) specifying a configuration of a database deployment;
generate, by the one or more servers, an instance of the database deployment comprising a first container running a database daemon, a second container running the database deployment and a database daemon proxy, and a third container running a first application generated from a first codebase, wherein in generating the instance, the one or more servers are configured to install the database daemon based on the configuration specified in the CRD;
receive a first command by the database daemon running on a first container the first application;
generate, by the database daemon, one or more query commands translating the first command, wherein the one or more query commands, when executed by the database deployment generated from a second codebase different from the first codebase, cause the database deployment to perform operations that are unavailable to the first application; and
send, by the database daemon, the one or more query commands to the database deployment, wherein the database daemon proxy is configured to receive the one or more query commands that were translated from the first command and sent by the database daemon.

2. The system of claim 1, wherein the first command is a remote procedure call.

3. The system of claim 1,
wherein the database deployment is a second database generated from the second codebase; and
wherein the one or more servers are further configured to:
receive remote procedure calls and generate one or more query commands by the database daemon for a third database generated from a third codebase different from the second codebase.

4. The system of claim 1, wherein the one or more servers are further configured to:
receive, in response to sending the one or more query commands, data responsive to a query defined by the one or more query commands.

5. The system of claim 1, wherein the database daemon proxy is configured to start the database deployment.

6. The system of claim 5, wherein the one or more servers are configured to:
receive an image of the database deployment;
store the image of the database deployment in data storage accessible by a cluster formed from the one or more servers; and
generate the database deployment as a containerized database using the image of the database deployment.

7. The system of claim 6, wherein in generating the instance, the one or more servers are further configured to install the database daemon proxy in the second container.

8. The system of claim 7, wherein the one or more servers are configured to start the database daemon and database daemon proxy using a database daemon init container.

9. The system of claim 1, wherein:
the one or more servers comprise a pod of computing nodes operating in a state specified by the CRD, wherein the first, second, and third containers are separate containers and are deployed in the pod.

10. A method performed by one or more servers implementing a database daemon, the method comprising:
receiving, by the one or more servers, a custom resource definition (CRD) specifying a configuration of a database deployment;
generating, by the one or more servers, an instance of the database deployment comprising a first container running a database daemon, a second container running the database deployment and a database daemon proxy, and a third container running a first application generated from a first codebase, wherein in generating the instance, the one or more servers are configured to install the database daemon based on the configuration specified in the CRD;
receiving a first command by the database daemon running on a first container the first application;
generating, by the database daemon, one or more query commands translating the first command, wherein the one or more query commands, when executed by the database deployment generated from a second codebase different from the first codebase, cause the database deployment to perform operations that are unavailable to the first application; and
sending, by the database daemon, the one or more query commands to the database deployment, wherein the database daemon proxy is configured to receive the one or more query commands that were translated from the first command and sent by the database daemon.

11. The method of claim 10, wherein the first command is a remote procedure call.

12. The method of claim 11,
wherein the database deployment is a second database generated from the second codebase; and
wherein the method further comprises:
receiving remote procedure calls and generating one or more query commands by the database daemon for a third database generated from a third codebase different from the second codebase.

13. The method of claim 10, wherein the method further comprises:
receiving, by the database daemon and in response to sending the one or more query commands, data responsive to a query defined by the one or more query commands.

14. The method of claim 10,
wherein the database daemon comprises a database daemon proxy in the second container; and
wherein the method further comprises starting the database deployment using the database daemon proxy.

15. The method of claim 14, wherein the method further comprises:
receiving an image of the database deployment;
storing the image of the database deployment in data storage accessible by a cluster formed from the one or more servers; and
generating the database deployment as a containerized database using the image of the database deployment.

16. The method of claim 15, wherein generating the instance comprises installing the database daemon proxy in the second container.

17. The method of claim 15, further comprising starting the database daemon and database daemon proxy using a database daemon init container.

18. The method of claim 17, wherein starting the database daemon and the database daemon proxy using the database daemon init container comprises providing an image of the database deployment in memory shared between the first and the second container.

19. The method of claim 10, wherein:
the one or more servers comprise a pod of computing nodes operating in a state specified by the CRD, wherein the first, second, and third containers are separate containers and are deployed in the pod.

20. One or more non-transitory computer-readable media storing instructions that when executed by one or more nodes causes the one or more nodes to implement a database daemon and perform operations comprising:
receiving, by the one or more nodes, a custom resource definition (CRD) specifying a configuration of a database deployment;
generating, by the one or more nodes, an instance of the database deployment comprising a first container running the database daemon, a second container running the database deployment and a database daemon proxy, and a third container running a first application generated from a first codebase, wherein in generating the instance, the one or more servers are configured to install the database daemon based on the configuration specified in the CRD;
receiving a first command by the database daemon running on a first container, the first application;
generating, by the database daemon, one or more query commands translating the first command, wherein the one or more query commands, when executed by the database deployment generated from a second codebase different from the first codebase, cause the database deployment to perform operations that are unavailable to the first application; and
sending, by the database daemon, the one or more query commands to the database, wherein the database daemon proxy is configured to receive the one or more query commands that were translated from the first command and sent by the database daemon.

* * * * *